(12) United States Patent
Liang

(10) Patent No.: US 6,306,065 B1
(45) Date of Patent: Oct. 23, 2001

(54) EXERCISING CART STRUCTURE

(76) Inventor: Fa-Kuang Liang, B1, No. 20, Hsia-Men St., Taipei (TW)

( * ) Notice: Subject to any disclaimer, the term of this patent is extended or adjusted under 35 U.S.C. 154(b) by 0 days.

(21) Appl. No.: 09/635,488

(22) Filed: Aug. 9, 2000

(51) Int. Cl.⁷ .................................................. A63B 21/00
(52) U.S. Cl. ............................ 482/51; 482/148; 280/218
(58) Field of Search ................................ 482/57, 51, 121, 482/148, 146, 122, 133, 136, 137, 125; 280/218, 200; 446/290

(56) References Cited

U.S. PATENT DOCUMENTS

| | | | |
|---|---|---|---|
| 3,572,701 | * | 3/1971 | Agamian ............................... 482/125 |
| 3,589,720 | * | 6/1971 | Agamian ............................... 482/125 |
| 4,071,261 | * | 1/1978 | Winchell ............................... 280/218 |
| 4,225,132 | * | 9/1980 | Archambault ........................ 482/137 |
| 4,595,197 | * | 6/1986 | Hagstrom et al. ..................... 482/51 |

* cited by examiner

Primary Examiner—Stephen R. Crow
(74) Attorney, Agent, or Firm—Dougherty & Troxell

(57) ABSTRACT

Exercising cart structure including a support beam, a front wheel frame and a rear wheel frame. One end of the support beam is connected with the front wheel frame, while the other end of the support beam is reciprocally slidably fitted with the rear wheel frame. Two front wheels and two rear wheels are respectively one-way rotatably mounted at two ends of the wheel shafts of the front and rear wheel frames. In use, a user sits on the seat and holds the handlebar of the front wheel frame with two hands with both feet stepping on two lateral step pads of the front wheel frame. The user's feet first push the front wheel frame forward by a certain distance and then the user's body and hip portion exert a force onto the rear wheel frame to move the same forward relative to the front wheel frame. Therefore, by means of forcing the front and rear wheel frames to alternately separate from and get close to each other, the exercising cart can gradually move forward. During the movement, a user can hold the handlebar to control the turning angle and moving direction of the exercising cart so as to achieve a harmonically and evenly exercising effect for the whole body.

15 Claims, 6 Drawing Sheets

# US 6,306,065 B1

EXERCISING CART STRUCTURE

BACKGROUND OF THE INVENTION

The present invention relates to an exercising cart structure in which one end of a support beam is rotatably connected with a front wheel frame, while the other end of the support beam is reciprocally slidably fitted with a rear wheel frame. Two front wheels and two rear wheels are respectively one-way rotatably mounted at two ends of the front and rear wheel frames. In use, a user sits on the seat and holds the handlebar of the front wheel frame with two hands with both feet stepping on two step pads of the front wheel frame. The user's feet push the front wheel frame forward and then the user's body and hip portion exert a force onto the rear wheel frame to move the same forward relative to the front wheel frame. Accordingly, the front and rear wheel frames alternately move forward so that the exercising cart can gradually move forward. During the movement, a user can hold the handlebar to turn the front wheel frame and control the moving direction of the exercising cart so as to achieve a harmonically exercising effect for the whole body.

The applicant's Taiwanese Patent Publication No. 86206463 discloses a crawling exerciser for a user to indoors exercise his/her body. When using such exerciser, the user must prostrate himself/herself and hold two sides of the front wheel frame with both hands and step on the step boards of the rear wheel frame with both feet. Then the user pushes the front wheel frame with both hands to move to a fixed position and then crouches his/her body to pull the rear wheel frame with both feet. Accordingly, the entire exerciser can gradually move forward. During the movement, the user must twist his/her body and turn the front wheel frame to control the moving direction. This achieves a harmonically and evenly exercising effect. In such exercise, the prostration and forward movement will achieve a relatively violent exercising effect so that it is hard to continuously use such exerciser for a long time.

The applicant's Taiwanese Patent Application No. 88207603 discloses an exercising cart as shown in FIGS. 1 and 2. In this exercising cart, a rear wheel frame 2 is freely back and forth slidably fitted with one end of a central support beam 3. A front wheel frame 1 is mounted at the other end of the support beam 3. Two front wheels 4 and two rear wheels 5 are respectively one-way rotatably mounted at two ends of the front and rear wheel frames 1, 2. The opposite inner sides of the front and rear wheel frames 1, 2 are respectively disposed with two extension plates 24 for hooking a resilient member 25. A user sits on the seat 23 of the rear wheel frame 2 and holds two ends of the handlebar 13 of the front wheel frame 1 with two hands. The user's both feet step on two step pads of the front wheel frame 1. The user's feet first push the front wheel frame 1 to move to a fixed position. Then, the user's hip portion exerts a force onto the rear wheel frame 2 to pull the same forward. The resilient member 25 provides a resilient pulling force to help in the pulling of the rear wheel frame 2. Accordingly, the exercising cart can gradually move forward. During the movement, the user's entire body is harmonically and evenly exercised.

In the above exercising cart, a central pivot seat 111 is disposed on the front beam 11 of the front wheel frame 1. Two sides of the pivot seat 111 are formed with stop blocks. A rotary shaft having engaging blocks is inserted in the pivot seat 111. When the exercising cart is turned left or right, the engaging blocks will be stopped by the stop blocks so as to restrict the turning angle within a predetermined range. Therefore, the user can turn the exercising cart by a desired angle, while ensuring the safety in turning.

In addition, the above exercising cart, hooking members are disposed at front and rear ends of the central support beam, whereby several exercising carts can be interconnected for multiple users to play.

SUMMARY OF THE INVENTION

It is a primary object of the present invention to provide an improved exercising cart structure which ensures safety during movement of the central operation beam. The exercising cart includes a support beam, a front wheel frame and a rear wheel frame having a telescopic assembly. One end of the support beam is connected with the front wheel frame, while the other sliding end of the support beam is nested into the telescopic assembly. A set of rollers are disposed in one end of the telescopic assembly facing the front wheel frame. The other end of the telescopic assembly is close for preventing the sliding end of the support beam from slipping out of the telescopic assembly. The sliding end of the support beam cooperates with the rollers in the telescopic assembly to reciprocally slide within the telescopic assembly. The sliding end of the support beam is always reciprocally telescopically slided within the telescopic assembly without protruding outward so that the environmental persons and articles are protected from being hurt during movement of the exercising cart. Therefore, the safety in use of the exercising cart is ensured.

The present invention can be best understood through the following description and accompanying drawings wherein:

DETAILED DESCRIPTION OF THE PREFERRED EMBODIMENTS

Figure 1:
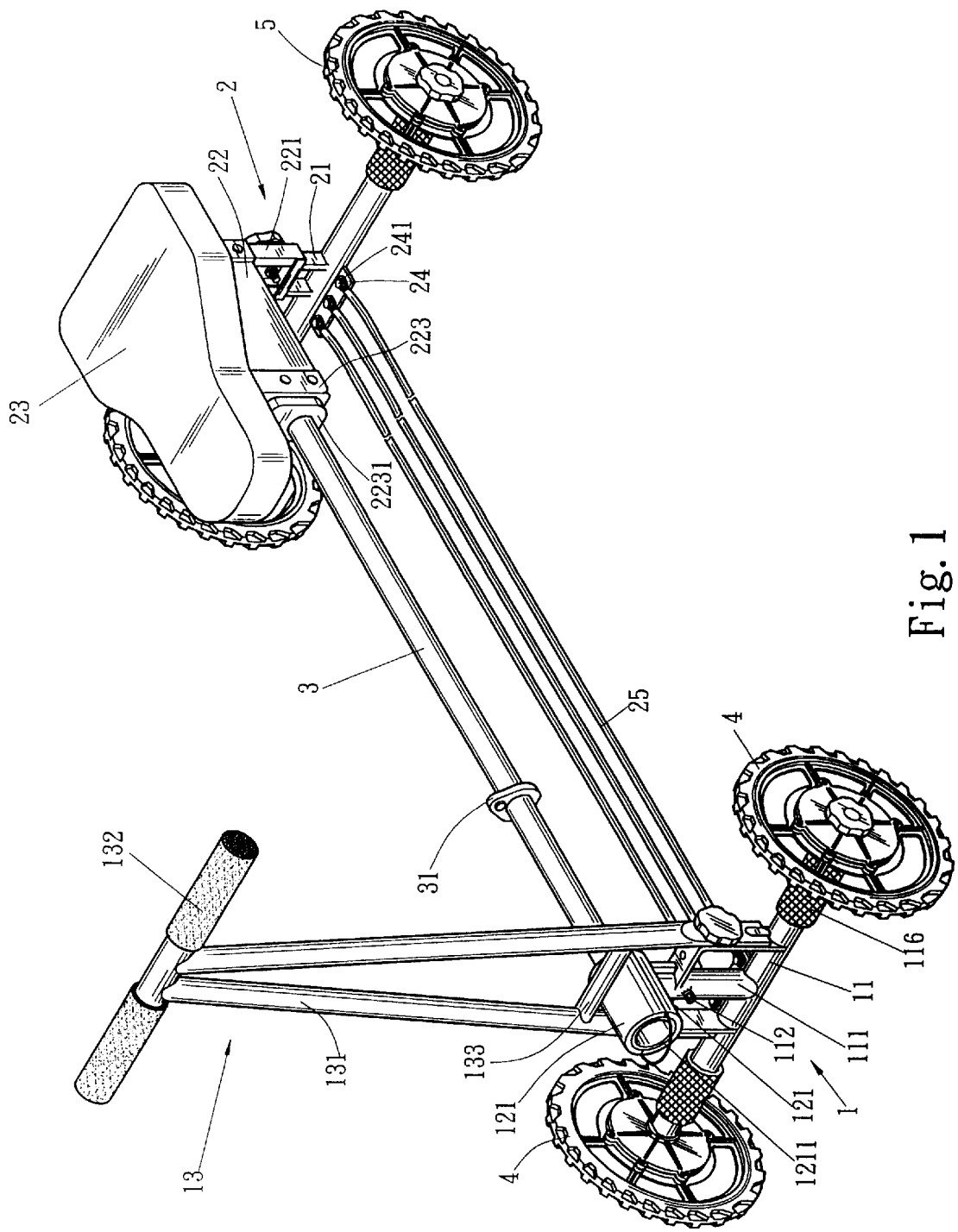
FIG. 1 is a perspective view of a prior exercising cart.
Figure 2:
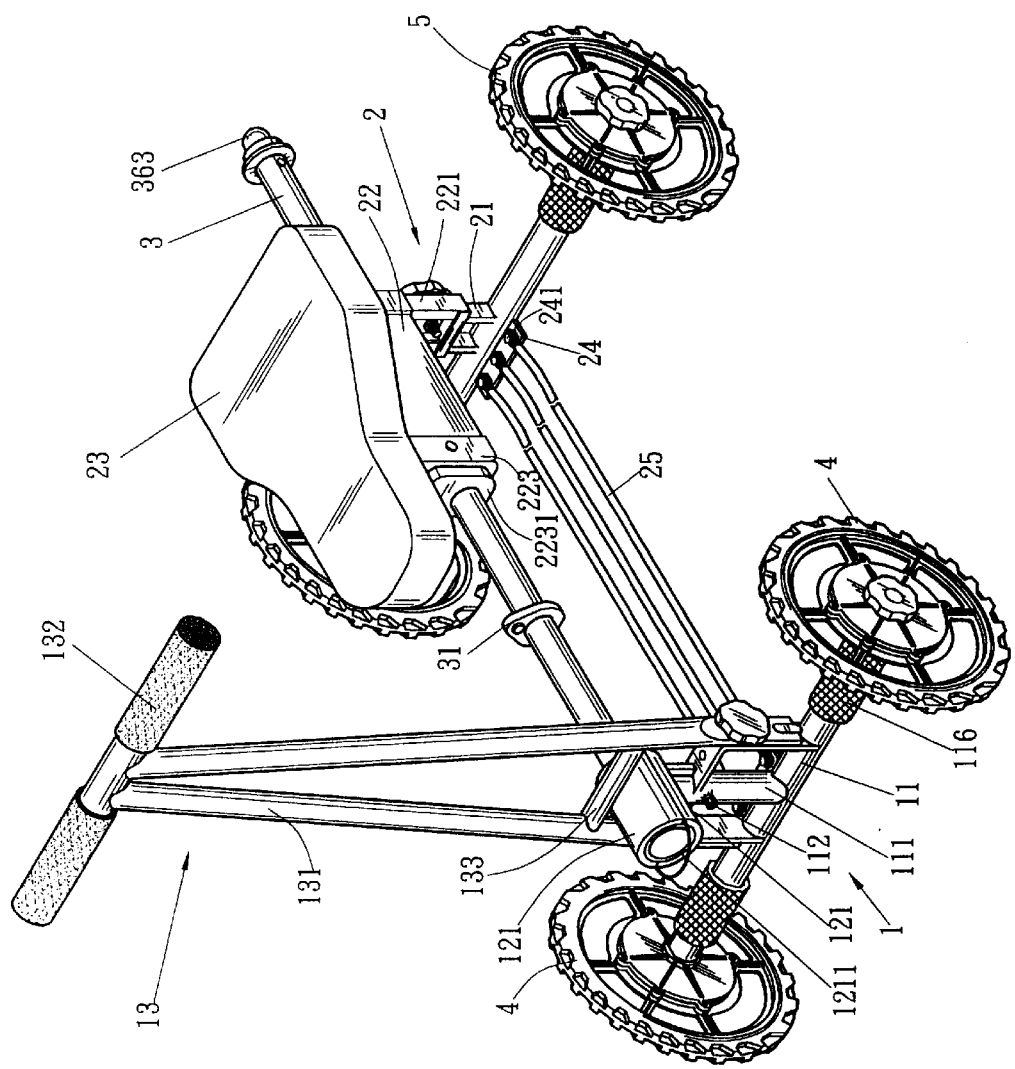
FIG. 2 is a perspective view according to FIG. 1, showing that the rear wheel frame is moved forward.
Figure 3:
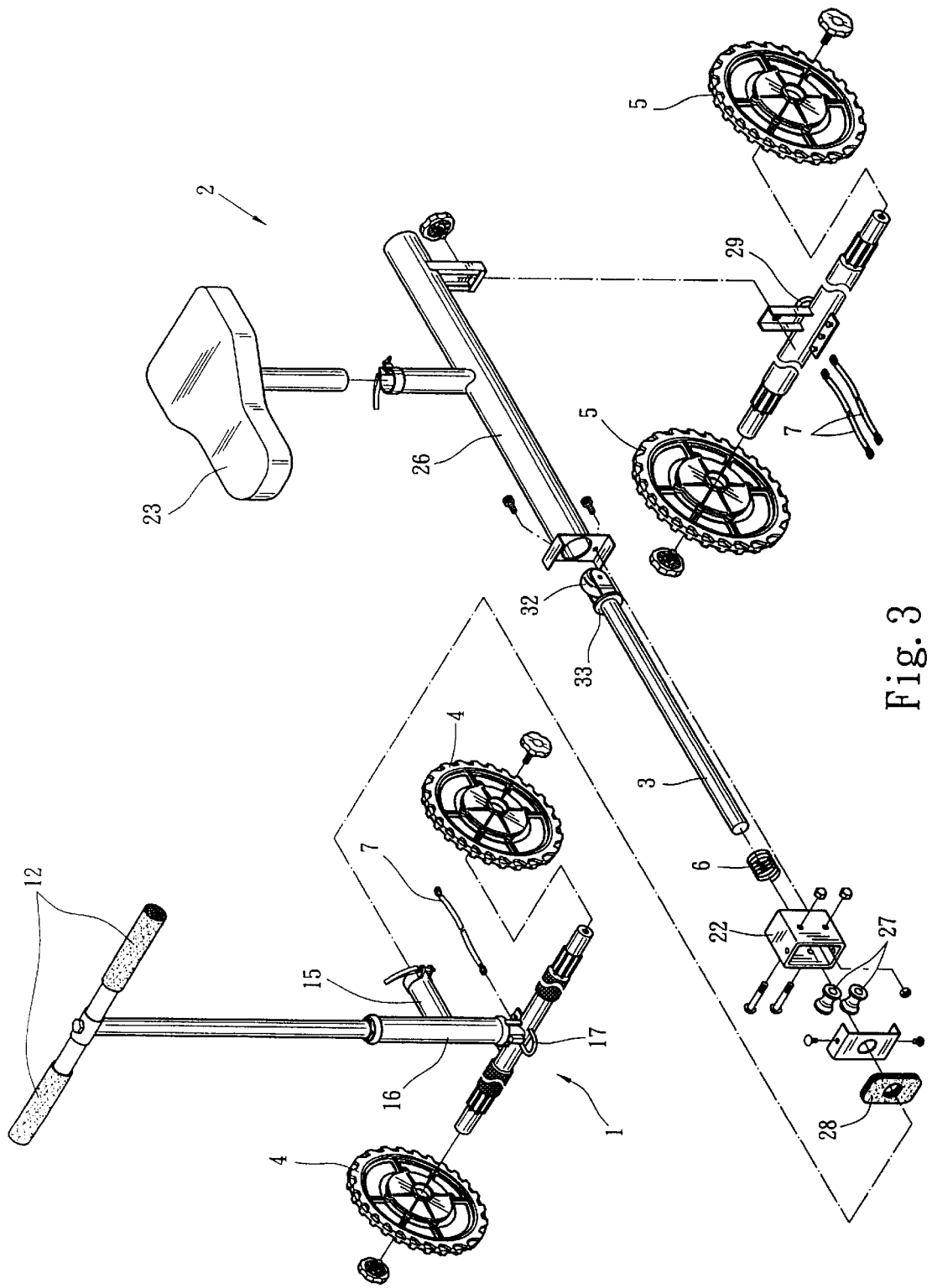
FIG. 3 is a perspective exploded view of a preferred embodiment of the present invention.
Figure 4:
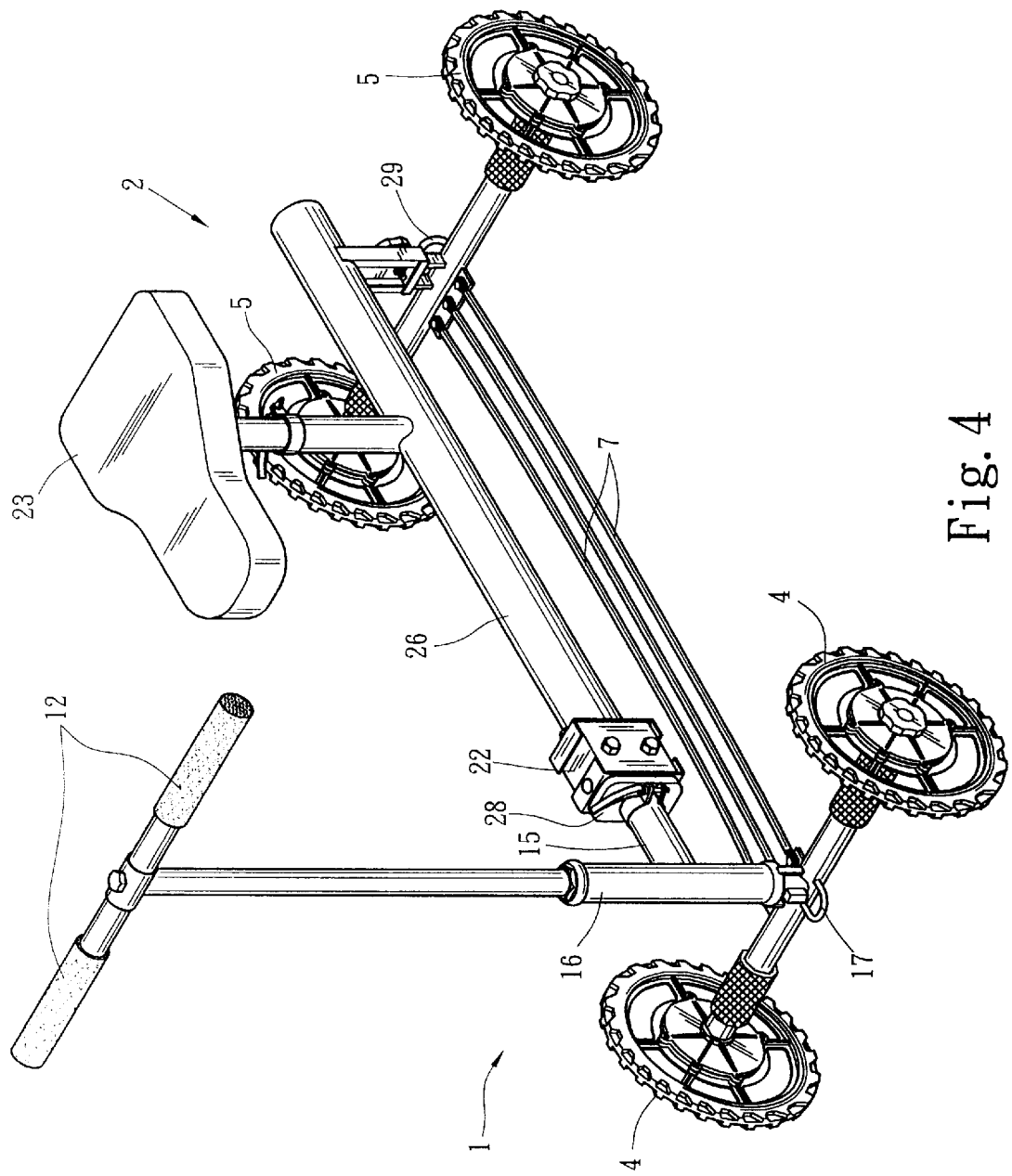
FIG. 4 is a perspective assembled view of the preferred embodiment of FIG. 3.
Figure 5:
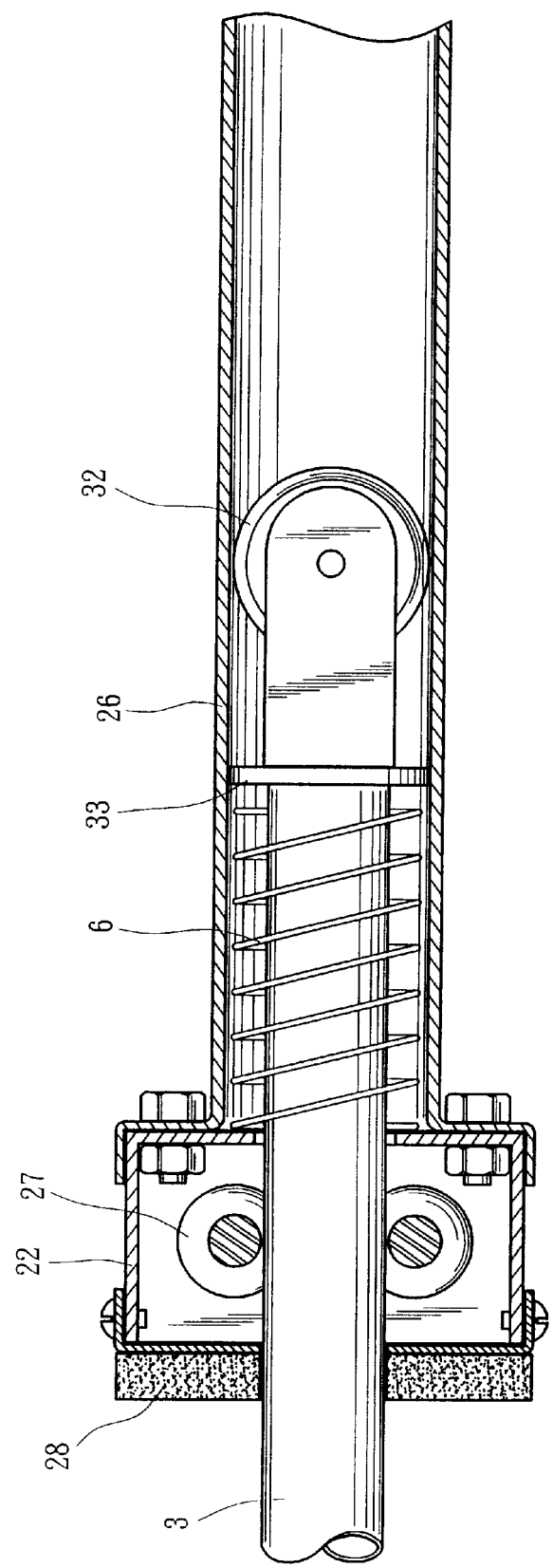
FIG. 5 is a sectional view of the support beam and telescopic assembly of the embodiment of FIG. 3.

Please refer to FIGS. 3 to 5. The present invention includes a front wheel frame 1, a rear wheel frame 2 and a support beam 3. One end of the support beam 3 is fitted with a sleeve 15 of the front wheel frame 1. The other end of the support beam 3 is equipped with a rolling member 32 and is sidably nested into a telescopic assembly 26 of the rear wheel frame 2. The telescopic assembly 26 includes a tube member and a seat 23 upward extending from the tube member. A guiding holder 22 is fixed at one end of the telescopic assembly 26 proximal to the front wheel frame 1. A set of rollers 27 are disposed in the guiding holder 22. The support beam 3 is passed between and clamped by the rollers 27. The guiding holder 22 communicates with a corresponding end of the tube member of the telescopic assembly 26, whereby the support beam 3 can extend from the guiding holder 22 into the tube member of the telescopic assembly 26. The sliding end of the support beam 3 can reciprocally slide within the tube member of the telescopic assembly 26. The other end of the telescopic assembly 26 is close to prevent the sliding end of the support beam 3 from slip out of the telescopic assembly 26. A handlebar 12 is disposed on upper side of the front wheel frame 1. In addition, two front wheels 4 and two rear wheels 5 are respectively one-way rotatably mounted at two ends of the wheel shafts of the front and rear wheel frames 1, 2. The above components form the exercising cart of the present invention. In use, a user sits on the seat 23 and holds the handlebar 12 with two hands with both feet stepping on the wheel shaft of the front wheel frame 1. The user's feet push the front wheel frame 1 forward, while the user's hands pull the front wheel frame 1 backward. At this time, since the front wheel frame 1 cannot move backward so that the rear wheel frame 2 is moved forward relative to the front wheel frame 1. Therefore, by means of the cooperative pulling and pushing force of the user's own hands and feet, the rear wheel frame 2 is forced to get close to the front wheel frame 1 and the front and rear wheels alternately move forward to make the exercising cart gradually move forward. During the pulling/pushing operation, the whole body of the user is exercised. Especially, when reciprocally moved, the support beam 3 of the exercising cart is kept sliding back and forth within the tube member of the telescopic assembly 24. Therefore, the support beam 3 will not continuously protrude outward during the movement and thus the environmental persons and articles are protected from being incautiously hurt and the safety can be ensured.

In addition, the handlebar 12 is fitted in an upward extending handlebar stem 16 connected with the wheel shaft of the front wheel frame 1. The wheel shaft can be operated and controlled by the handlebar 12 to freely turn the front wheels 4. Therefore, the user can easily control the moving direction of the exercising cart.

A resilient member 6 is disposed in the tube member of the telescopic assembly 26 and fitted around the support beam 3 between the sliding end of the support beam 3 and the outer side of the guiding holder 22. One end of the resilient member 6 abuts against a stop board 33 disposed at the sliding end of the support beam 3, while the other end of the resilient member 6 is leant against a lateral wall of the guiding holder 22. When the sliding end of the support beam 3 is extended from the telescopic assembly 26 to a maximum extent, the resilient member 6 serves to buffer the impact force exerted by the support beam onto the telescopic assembly 26.

In addition, a buffer member 28 is disposed on outer side of the guiding holder 22 facing the front wheel frame 1. During reciprocal pushing/pulling of the exercising cart, the buffer member 28 serves to buffer the impact force generated in relative sliding movement. The buffer member 28 also serves to seal the opening of the guiding holder 22 through which the support beam 3 is slided into the guiding holder 22. Therefore, the fingers of the user are prevented from being drawn into the guiding holder 22 during the telescopic operation.

In addition, at least one resilient member 7 is disposed between the front and rear wheel frames 1, 2. By means of the auxiliary resilient pulling force of the resilient member 7, the user can operate the exercising cart with less strength.

Figure 6:
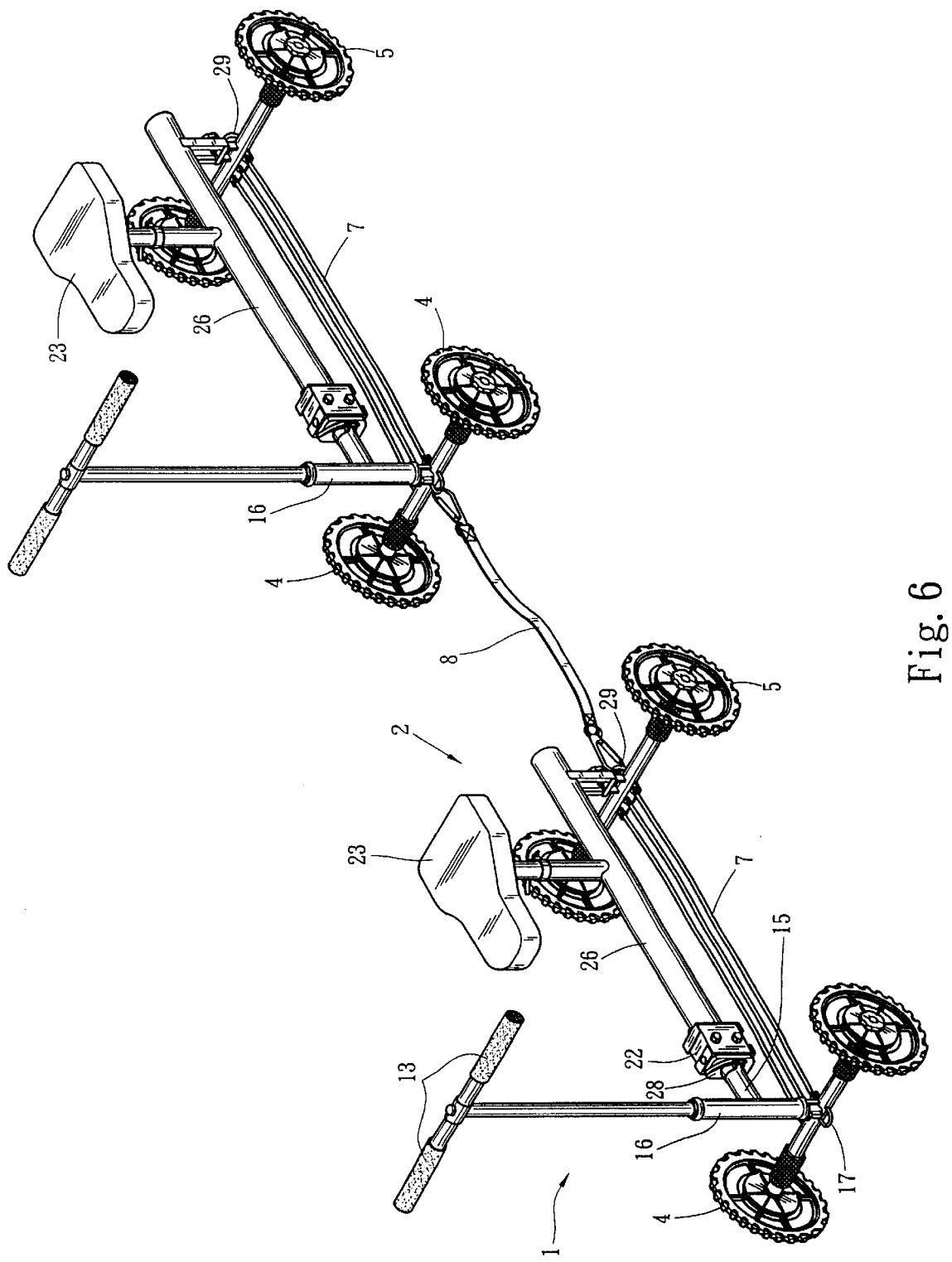
FIG. 6 shows that two exercising carts of the present invention are serially connected by a hooking member.

Moreover, the wheel shafts of the front and rear wheel frames 1, 2 are respectively equipped with two hooking sections 17, 29. A hooking member 8 is connected to the hooking sections 17, 29 to serially connect several exercising carts with each other as shown in FIG. 6 for multiple users to play at the same time.

The above embodiments are only used to illustrate the present invention, not intended to limit the scope thereof. Many modifications of the above embodiments can be made without departing from the spirit of the present invention.

What is claimed is:

1. Exercising cart structure comprising a support beam, a front wheel frame and a telescopic assembly having a rear wheel frame, one end of the support beam being connected with the front wheel frame, the other end of the support beam being nested into the telescopic assembly, a set of rollers being disposed in one end of the telescopic assembly facing the front wheel frame, the support beam being passed between and clamped by the rollers, a sliding end of the support beam being slidably fitted in the telescopic assembly, whereby the sliding end of the support beam is reciprocally telescopically slidable within the telescopic assembly, two front wheels and two rear wheels being respectively one-way rotatably mounted at two ends of the wheel shafts of the front and rear wheel frames, whereby by means of the reciprocal telescopic movement of the support beam relative to the telescopic assembly, the front and rear wheels alternately move forward to make the entire exercising cart move forward.

2. Exercising cart structure as claimed in claim 1, wherein a rolling member is mounted at the sliding end of the support beam nested in the telescopic assembly.

3. Exercising cart structure as claimed in claim 1, wherein a resilient member is fitted around the support beam between one end of the telescopic assembly proximal to the front wheel frame and the sliding end of the support beam.

4. Exercising cart structure as claimed in claim 1, wherein a handlebar is disposed on upper side of the front wheel frame, the handlebar being rotatably fitted in a handlebar stem, the handlebar stem being fixedly horizontally connected with the support beam, whereby the front wheel frame can be operated and controlled by the handlebar to freely turn.

5. Exercising cart structure as claimed in claim 1, wherein at least one extensible resilient member is connected between the wheel shafts of the front and rear wheel frames.

6. Exercising cart structure as claimed in claim 1, wherein the telescopic assembly is a tube member and a seat upward extends from the tube member.

7. Exercising cart structure as claimed in claim 1, wherein the front and rear wheel frames are respectively equipped with two hooking sections, a hooking member being connected to the hooking sections to serially connect several exercising carts with each other for multiple users to play at the same time.

8. Exercising cart structure as claimed in claim 1, wherein a guiding holder is disposed at one end of the telescopic assembly proximal to the front wheel frame and the set of rollers are mounted in the guiding holder, the front and rear sides of the guiding holder being formed with perforations, whereby the support beam passes through the front side of the guiding holder and extends from the rear side thereof into the telescopic assembly.

9. Exercising cart structure as claimed in claim 8, wherein a buffer member is disposed on an outer side of the guiding holder facing the front wheel frame.

10. Exercising cart structure as claimed in claim 8, wherein a rolling member is mounted at the sliding end of the support beam nested in the telescopic assembly.

11. Exercising cart structure as claimed in claim 8, wherein a resilient member is fitted around the support beam between one end of the telescopic assembly proximal to the front wheel frame and the sliding end of the support beam.

12. Exercising cart structure as claimed in claim 8, wherein a handlebar is disposed on upper side of the front wheel frame, the handlebar being rotatably fitted in a handlebar stem, the handlebar stem being fixedly horizontally connected with the support beam, whereby the front wheel frame can be operated and controlled by the handlebar to freely turn.

13. Exercising cart structure as claimed in claim 8, wherein at least one extensible resilient member is connected between the wheel shafts of the front and rear wheel frames.

14. Exercising cart structure as claimed in claim 8, wherein the telescopic assembly is a tube member and a seat upward extends from the tube member.

15. Exercising cart structure as claimed in claim 8, wherein the front and rear wheel frames are respectively equipped with two hooking sections, a hooking member being connected to the hooking sections to serially connect several exercising carts with each other for multiple users to play at the same time.

* * * * *